United States Patent [19]

Muehlhausen et al.

[11] 3,926,350
[45] Dec. 16, 1975

[54] PLASTIC COLLAR PERCOLATOR

[75] Inventors: Herbert N. Muehlhausen; John J. Unger, both of Elmhurst, Ill.

[73] Assignee: Sunbeam Corporation, Chicago, Ill.

[22] Filed: July 9, 1974

[21] Appl. No.: 486,923

[52] U.S. Cl. ............................... 222/475; 222/567
[51] Int. Cl.² .................................... A47G 19/14
[58] Field of Search .......... 220/94 R, 324, 325, 318, 220/296, 298, 293, 300; 215/100 A; 16/110 A, 114 A; 222/465, 475, 542, 566–570, 571; 99/308, 310–312

[56] References Cited
UNITED STATES PATENTS

| | | | |
|---|---|---|---|
| 2,661,862 | 12/1953 | Howe | 220/296 |
| 2,998,169 | 8/1961 | Fischer | 222/475 |
| 3,154,227 | 10/1964 | Amdeson et al. | 222/542 |
| 3,282,196 | 11/1966 | Mahship et al. | 215/100 A X |
| 3,306,505 | 2/1967 | Serio | 222/542 X |
| 3,491,924 | 1/1970 | Bloomfield et al. | 222/475 X |

OTHER PUBLICATIONS
Montgomery Ward Catalogue, Fall–Winter 1973, p. 1136, Glass Perks with Replaceable Unit.

*Primary Examiner*—Stanley H. Tollberg
*Assistant Examiner*—Larry H. Martin
*Attorney, Agent, or Firm*—George R. Clark; Neil M. Rose; Clifford A. Dean

[57] ABSTRACT

An electric coffee percolator having a glass vessel removably mounted on a combination heater and handle base assembly wherein the upper end of the glass vessel has a non-breakable plastic one-piece split collar member sealingly mounted thereon and having a pouring spout formation. A positive twist-lock cover is provided for the collar member. A second embodiment has a secondary latching arrangement operable to latch the vessel to the base assembly should a primary latching arrangement be inoperable due to a partial misalignment of the vessel on the base assembly.

6 Claims, 13 Drawing Figures

U.S. Patent    Dec. 16, 1975    Sheet 2 of 4    3,926,350
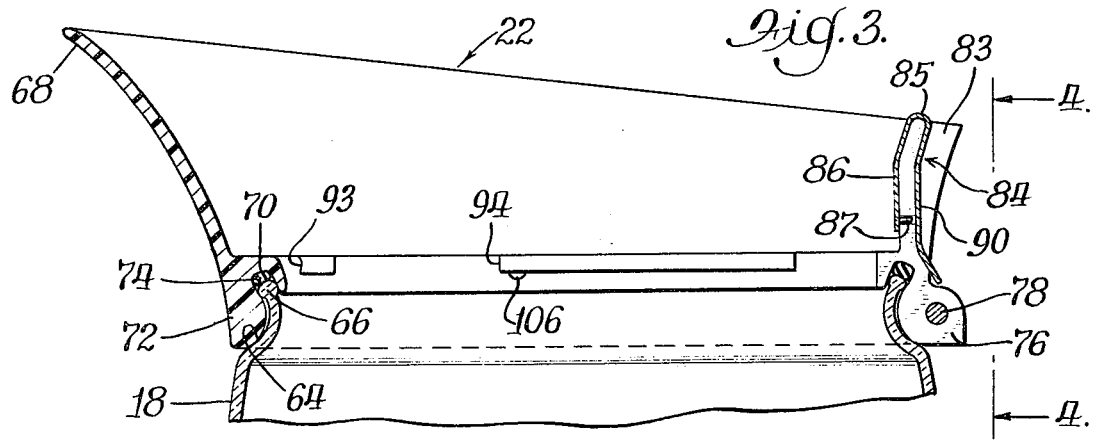
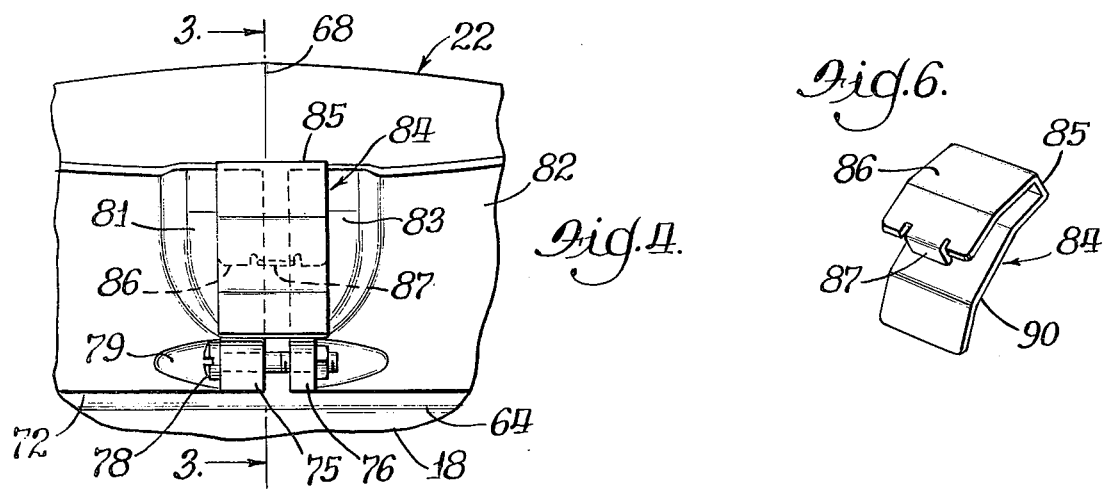
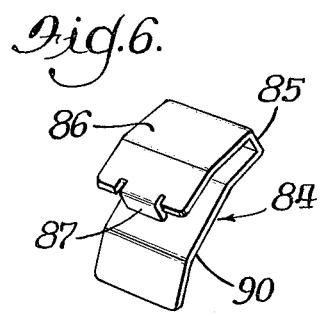
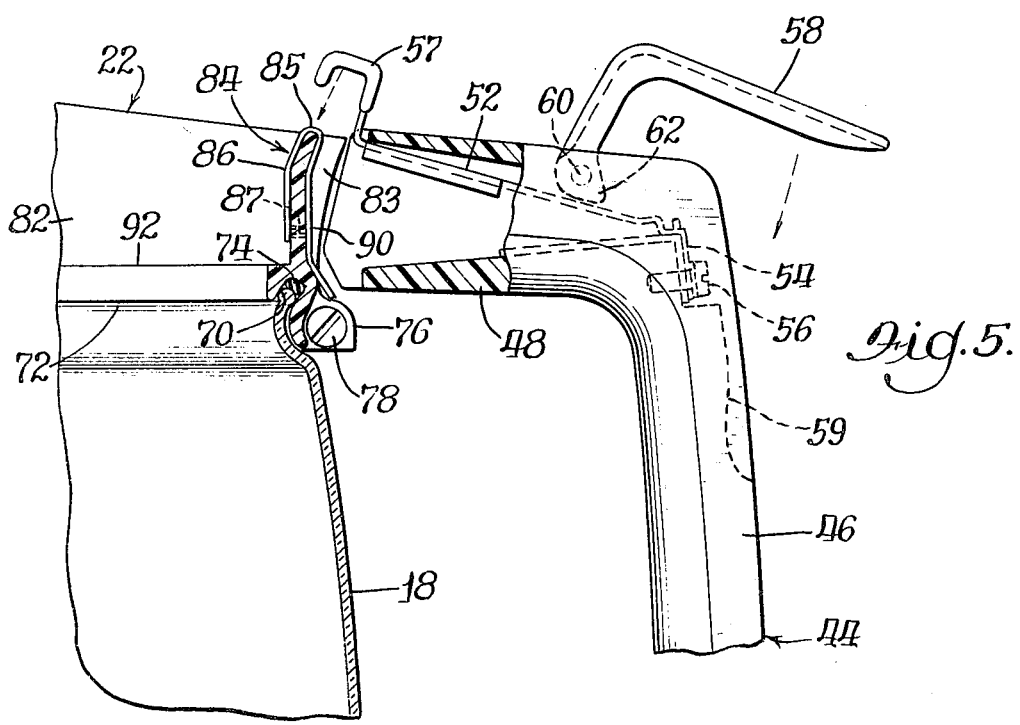

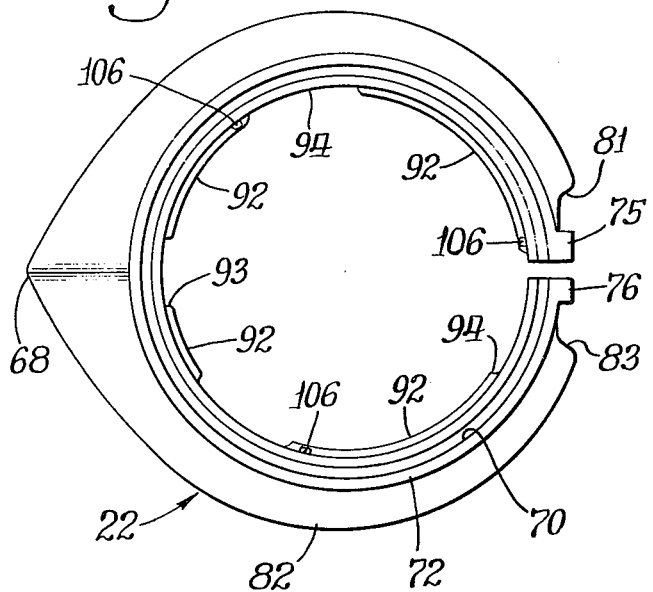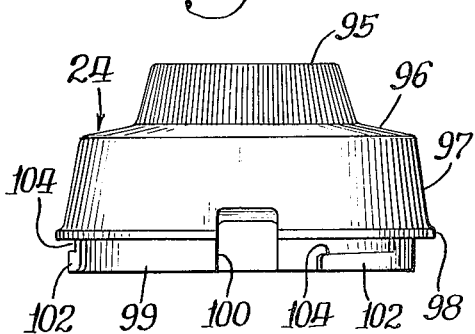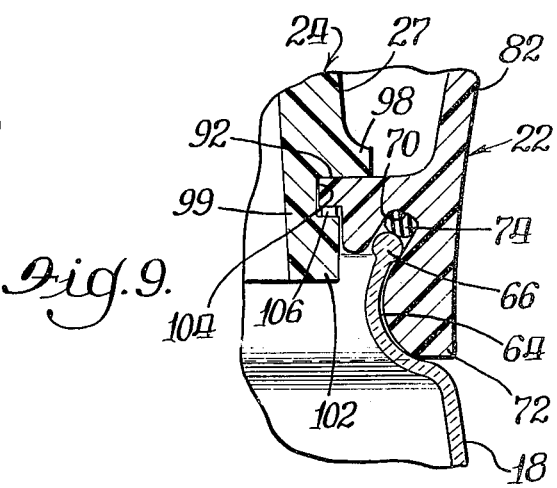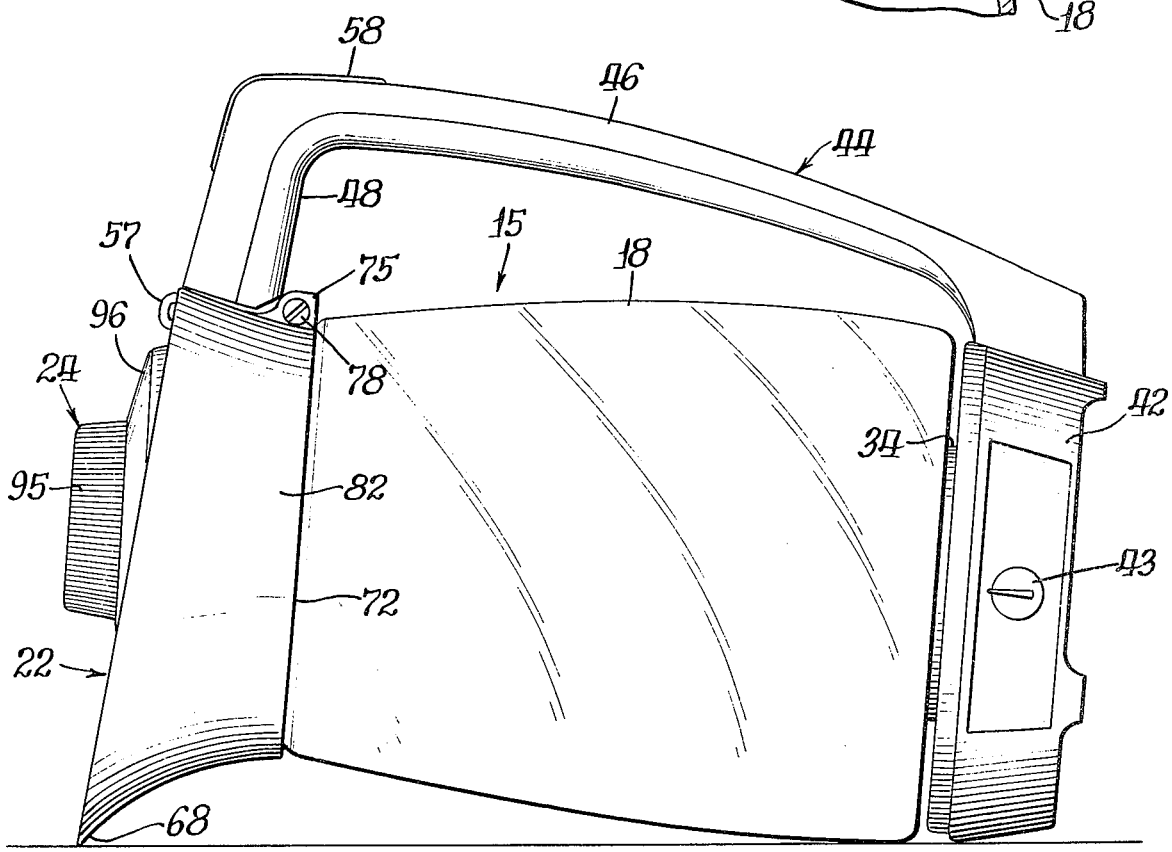

PLASTIC COLLAR PERCOLATOR

BACKGROUND OF THE INVENTION

1. Field of the Invention

The present invention pertains to an electric percolator which is primarily characterized by a vessel formed of glass or other breakable material and having a one-piece molded plactic non-breakable split collar member sealingly mounted on the upper end thereof. A pouring spout formation is provided on the collar member. The vessel is removably and sealingly mounted on a base assembly having a heater portion which projects into the vessel through an opening formed in the bottom thereof and a handle portion which is adapted to be latched into retaining engagement over the upper edge of the plastic collar member. A twist lock cover is provided for positive locking engagement with the plastic collar member.

2. Description of the Prior Art

Known in the prior art are electric percolators of this general type which are characterized by all glass vessels, for instance, U.S. Pat. Nos. 3,682,089, patented Aug. 8, 1972, and 3,809,285, patented May 7, 1974. Although such percolators provide excellent coffee, the pouring spout and upper portion of the all glass vessels are particularly susceptible to breakage and chipping should the percolator be inadvertently tipped over or knocked against a faucet while filling same with water at a sink. It is further somewhat difficult to provide a tight-fitting positively locked cover for such all-glass vessels.

Also known in the prior art are glass vessels having annular non-split plastic or metallic collar members which are resilient enough to be snapped over the upper end of a glass vessel. Separate clamping members are then provided for clamping the collar members on the glass vessels, as disclosed, for instance, in U.S. Pat. Nos. 2,998,169, patented Aug. 29, 1961; 3,154,227, patented Oct. 24, 1964; and 3,330,449, patented Jul. 11, 1967. Another known plastic-collar percolator on the market, which is not known to be patented, has an annular resilient mounting member snapped over the upper end of a glass vessel with an annular non-split collar threaded thereon. Such multipart collars are believed to be more costly to manufacture, to be more difficult for a housewife to disassemble for a thorough cleaning, and to provide more meeting surfaces and gaps for the possible undesirable collection of rancid liquids and debris than the plastic-collar percolator of the present invention.

SUMMARY OF THE INVENTION

The present invention is concerned with an electric percolator which is characterized by a glass vessel removably mounted on a combination heater and handle base assembly and having a one-piece split collar member injection molded on non-breakable plastic sealingly mounted on the upper end of the glass vessel. The collar member is provided with a pouring spout formation and a downwardly opening groove carrying a solid sponge rubber sealing member which is seated over the upper beaded edge of the glass vessel. Fastener means are provided for tightening the split ends of the collar member on the glass vessel. A metallic clip member is slipped over the adjacent split ends of the collar member to overlie any gap present therebetween and a hook portion of a resilient latch member mounted in the upper portion of the handle is engageable over the clip member to latchingly retain the vessel on the base assembly. A second embodiment provides a secondary latching arrangement should the primary latch hook not engage over the clip member due to an axial misalignment of the vessel on the base assembly. The secondary latching arrangement is characterized by an extension hook provided on the clip member and a second latch hook provided on the resilient latch member which is engageable with the clip member extension hook even if the vessel should be slightly misaligned on the base assembly. Further, a cover or cap is provided which has a position twist-lock engagement with the plastic collar member.

Accordingly, it is an object of the present invention to provide an improved electrical percolator of the type having a glass vessel removably mounted on a base assembly wherein the glass vessel is provided on its upper end with a properly sealed non-breakable plastic collar member.

It is another object of the present invention to provide such a percolator wherein the collar member is a one-piece split member having a pouring spout formation and a downwardly opening groove which is sealingly fitted over the beaded upper edge of the glass vessel and which is tightened thereon by suitable fastener means.

Still another object of the present invention is to provide such a percolator having an alignment clip member which is slipped over the adjacent split ends of the collar member and extends over any gap present therebetween.

Yet another object of the present invention is to provide such a percolator wherein first latch means are provided for latching the percolator to the base assembly and wherein secondary latch are provided should the first latch means not be properly engaged due to an axial misalignment of the vessel on the base assembly.

Another object of the present invention is to provide such a percolator having a cover which has a positive twist-lock engagement with the collar member.

It is still another object of the present invention to provide such a percolator wherein the likelihood of breakage or chipping of the glass portion of the vessel due to inadvertently tipping the percolator over or hitting the upper edge of same against a faucet while filling it with water is substantially eliminated due to the presence of the non-breakable plastic collar member and wherein the likelihood of spilling the entire contents thereof, usually very hot coffee, if same should be tipped over is substantially reduced due to the positive locked cover thereof.

Further objects and advantages will become apparent as the following description proceeds and the features of novelty which characterize the invention will be pointed out in the claims annexed to and forming a part of the specification.

BRIEF DESCRIPTION OF THE DRAWINGS

For a better understanding of the present invention, reference may be had to the accompanying drawings in which:

FIG. 3 is a vertical sectional side view of the collar member mounted on the upper end of the vessel and taken generally along line 3—3 of FIG. 4;

FIG. 4 is a partial rear elevational view of the collar member mounted on the upper end of the vessel and taken generally along line 4—4 of FIG. 3;

FIG. 5 is a partial side elevational view with some parts shown in vertical section of the handle about to be latched to the collar portion of the vessel;

FIG. 6 is a perspective view of the clip member;

FIG. 7 is a bottom plan view of the collar member;

FIG. 8 is a front elevational view of the cover or cap;

FIG. 9 is an enlarged fragmentary vertical sectional view showing the cap engaged with the collar member;

FIG. 10 is a side elevational view of the electrical percolator of the present invention tipped over on a flat supporting surface;

DESCRIPTION OF THE PREFERRED EMBODIMENTS

Figure 1:
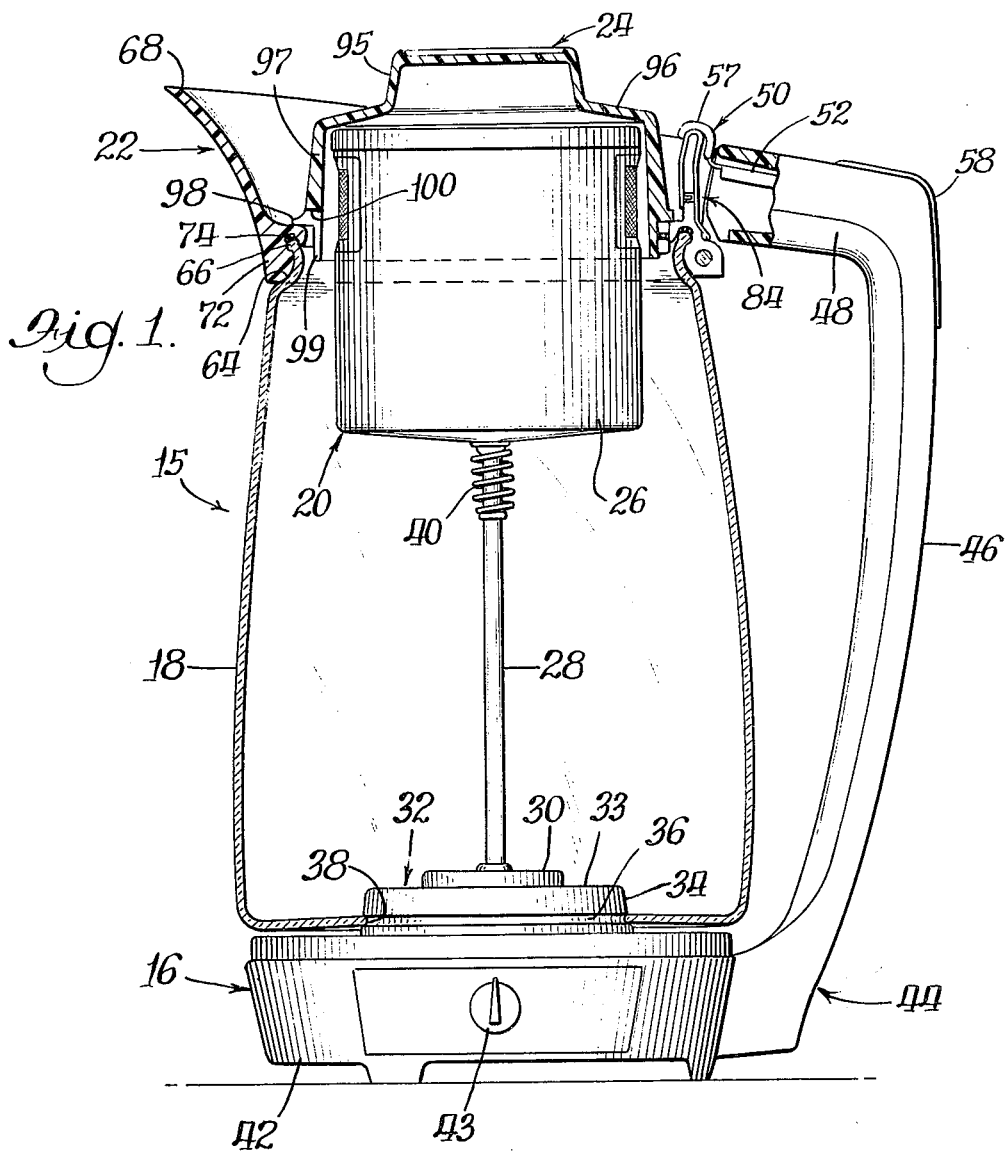
FIG. 1 is a side elevational view of an electrical percolator embodying the invention with the vessel, collar member, cap, and a portion of the handle shown in vertical section.
Figure 2:
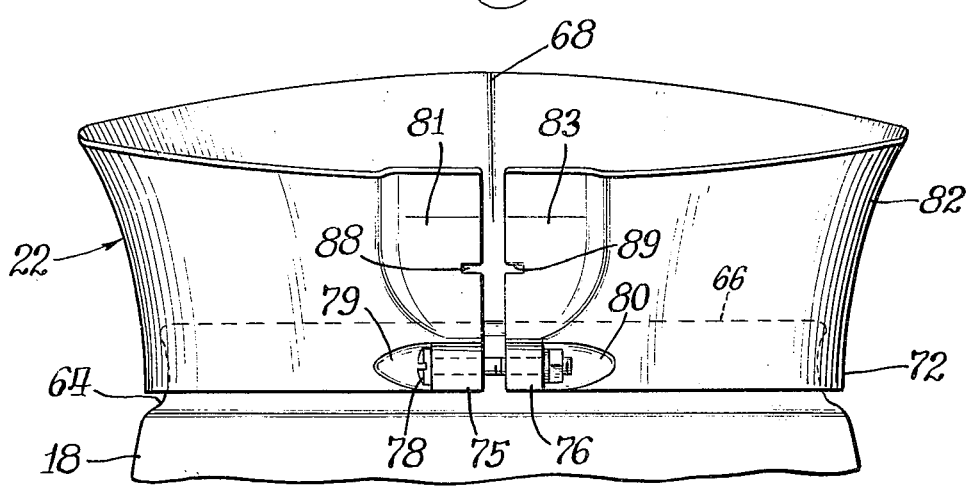
FIG. 2 is an enlarged rear elevational view of the collar member mounted on the upper end of the vessel with the clip member removed for clarity.

Referring now to the drawings, there is shown in FIG. 1 a side elevational view, partially in vertical section, of one embodiment of the percolator of the present invention which is designated generally by reference numeral 15. The percolator 15 includes a base assembly 16, a glass vessel 18, a pump and basket assembly 20, a plastic collar member 22, and a cap or cover 24. The pump and basket assembly 20 is of a conventional design including a basket 26 for receiving ground coffee which is mounted on a tube 28 with a pump 30 being provided at the lower end of the tube 28.

The base assembly 16 includes a heater assembly 32 which may be of the type which is fully disclosed in U.S. Pat. No. 3,682,089, patented Aug. 8, 1972. The heater assembly 32 is characterized by a generally cylindrical housing portion 33 which projects upwardly from the center of the base assembly 16 and has a concave well formed in its upper surface for receiving the pump 30. The outer surface of the heater housing portion 33 is provided with a gasket 34 having an annular groove 36 found therein which is adapted to sealingly receive the inner edge of a hole 38 formed in the bottom wall of the vessel 18. When the cover 24 is engaged with the collar member 22, the cover 24 also engages the top of the basket 26 and a helical spring 40 positioned immediately below the basket 26 biases the tube 28 and the pump 30 provided on the lower end thereof downwardly into seated engagement in the concave pump well of the heater assembly, 32. The base assembly 16 includes a base portion 42 which may be provided with a control knob 43 for a known type thermostat-controlled strength selector. A somewhat U-shaped handle 44 extends upwardly from the side of the base portion 42 and has a gripping portion 46 and a hollow latching portion 48 provided at the upper end thereof adjacent the upper end of the vessel.

In order to retain the vessel 18 in assembled relation to the base assembly 16, there is provided a latch assembly 50 which is fully disclosed in U.S. Pat. No. 3,809,285, patented May 7, 1974. The latch assembly 50 is characterized by a resilient latch member 52 having a downwardly bent end portion 54 which is secured to a portion of the handle 44 by an assembly screw 56 and by a hook-shaped end portion 57 which is engageable over the upper edge of the collar member 22 mounted on the vessel 18. The resilient latch member 52 is actuated by an L-shaped lever 58 which is pivotally mounted in an L-shaped recess 59 formed in the handle 44 on a pivot pin 60. A cam formation 62 provided on the inner end of the L-shaped lever 58 engages the resilient latch member 52 intermediate its secured end 54 and its hook formation 57 whereby to flex and hold the resilient latch member 52 in its latching position. The hook portion 57 may be provided with a plastic coating but same is not necessary.

In the two U.S. patents previously referred to herein U.S. Pat. NOs. 3,682,089 and 3,809,285), the vessel is formed completely of glass. The primary disadvantage of an all-glass vessel is the obvious problem of breakage if the vessel should be accidentally tipped over, particularly at the upper edge and pouring spout areas which would engage the supporting surface with the greatest force. Chipping or cracking of the upper portion of an all-glass vessel may also occur when same is being filled with water at a kitchen sink as a result of inadvertently knocking same against the faucet. A further problem with all-glass vessels is properly fitting a cap or cover thereto which will not come off if the vessel is accidentally knocked over, spilling the contents thereof which is usually very hot coffee.

The foregoing problems are substantially overcome by the vessel 18 having the plastic collar member 22 mounted thereon which is shown in the drawings. Preferably the collar member 22 is made of non-breakable polypropylene and is formed by an injection molding process. Although the plastic collar member 22 is normally used with a glass vessel, it is noted that it could just as well be used with vessels formed of material other than glass, breakable or non-breakable.

As shown in the drawings, the vessel 18 terminates at its upper end with an annular groove 64 and a beaded upper edge 66. The collar member 22 is formed as a split member which, after it is mounted on the vessel 18, is tightened to draw the two split ends thereof toward one another in tight gripping engagement with the upper end of the vessel 18. A pouring spout formation 68 is provided diametrically opposite from the split ends. It is quite difficult to provide a smooth edge at the pouring spout formation of an all glass vessel and it is noted that the spout formation 68 of the molded plastic collar member 22 is characterized by a very smooth edge which provides a narrower pouring stream and a better stream cut-off with little or no dripping than is possible with the pouring spout of an all-glass vessel.

The underside of the collar member 22 is characterized by a downwardly opening groove 70 and outwardly thereof by a depending skirt portion 72 which is adapted to be received in the groove 64. A split O-ring type solid sponge rubber seal 74 of a silicone closed-cell structure is disposed in the groove 70 for engagement with the beaded edge 66 to provide a fluid-tight seal between the vessel 18 and the collar member 22. As it is extremely difficult to hold tolerances on the upper beaded edges of glass vessels, the seal 74 also serves to accommodate any such imperfections while maintaining a proper seal.

The split ends of the collar member 22 are each provided adjacent the lower edge thereof with integral rearwardly projecting embossments 75 and 76 which are characterized by horizontally aligned bores adapted to receive a bolt and nut fastener 78 for tightening the collar member 22 on the vessel 18. The outer surface of the collar member 22 adjacent the embossments 75 and 76 is provided with clearance depressions 79 and 80.

Although the collar member 22 is characterized generally by an outwardly flared side wall 82, the split edges above the embossments 75 and 76 are formed with inwardly offset generally planer horizontally aligned depressions 81 and 83 adapted to receive a metallic alignment clip 84. The clip 84 as best shown in FIG. 6, is generally U-shaped in configuration and is characterized by a bight portion 85 adapted to fit over the upper edges of the split ends of the collar member 22 and across any gap that might be present therebetween with the bight portion 85 providing a seat for the hook portion 57 of the latch assembly 50, by an inner portion 86 formed by a pair of slightly angled planer portions and having a bent tab 87 which extends through a pair of horizontally aligned slots 88 and 89 formed in the split edges of the collar member 22 as an aid in properly aligning the split ends of the member 22, and by an outer leg portion 90 which is formed of three slightly angled planar portions and which is disposed in the aligned depressions 81 and 83. The outer leg portion 90 also extends across the gap that might be present between the two split ends of the member 22 as well as across the open end of the adjacent hollow portion of the handle 44 whereby the outer leg portion 90 also serves as a shield preventing condensation from entering the hollow handle portion 44 and running down the recess 59 to the lower portion of the handle 44 where electrical contacts may be provided.

In order to provide a tight fitting cap or cover 24 for the percolator 15, the collar member 22 is provided on the inner surface of the side wall 82 intermediate the top and bottom thereof with an inwardly extending flange 92. The flange 92 has a pouring cut-out 93 provided on the inner periphery thereof in alignment with the spout formation 68 as well as a series of unevenly spaced cut-outs 94 for latching cooperation with the cover 24. The cap or cover 24 is of an inverted cup-shaped configuration with a knurled knob 95 formed on the top wall 96 thereof. The cover 24 is further characterized by a depending side wall 97 having at its lower end an annular outwardly extending flange 98 adapted to be rotatably supported on the flange 92 of the collar member 22 and by a reduced diameter further depending skirt portion 99 having an outer diameter slightly less than the inner diameter of the flange 92 of the collar member 22. An open bottom pouring slot 100 is formed in the depending skirt 99, the flange 98 and the lower portion of the side wall 97.

Unevenly spaced about the outer surface of the depending skirt 99 are a series of locking tabs 102. The tabs 102 are positioned for alignment with the unevenly spaced cut-outs 94 of the collar flange 92 and are provided immediately below the flange 98 with open-ended horizontally extending slots 104 having a vertical dimension adapted to receive adjacent non-cut-out portions of the collar flange 92 when the cover 24 is rotated in a clockwise direction, as viewed from the top. When the closed ends of the slots 104 abut against the portions of the collar flange 92 defining the ends of the cut-outs 94 after such clockwise rotation of the cover 24, the pouring slot 100 of the cover 24 is properly aligned with the pouring cut-out 93 and the spout formation 68 of the collar member 22. To provide a relatively tight fit between the cover 24 and the collar member 22, the surfaces of the tabs 102 defining the bottoms of the slots 104 are inclined slightly upwardly toward the closed ends thereof. Also the undersides of the portions of the collar flange 92 which are positioned at the closed ends of the slots 104, when the cover 24 is in its fully locked position in the collar member 22, are provided with small depending protuberances 106 (FIGS. 3, 7 and 9) which engage the surface of the tabs 102 defining the bottoms of the cover slots 104 adjacent the closed ends thereof whereby to further increase the tightness of the fit therebetween.

As illustrated in FIG. 10, should the percolator 15 tip over forwardly, the supporting surface would be forcibly hit only by the spout formation 68 of the plastic collar member 22 with the likelihood of the glass vessel 18 breaking being substantially reduced. Although not illustrated in the drawings, even if the percolator 15 should be tipped over sideways, the outwardly flared side wall 82 of the plastic collar member 22 is the only upper portion of the percolator 15 that would forcibly hit the supporting surface. As is evident in FIG. 10, in the event of the percolator 15 tipping over, the side wall of the glass vessel 18 immediately above the bottom wall of same may come into engagement with the supporting surface but with so little force that breakage is very unlikely.

Although quite unlikely, it is possible that one might actuate the latch assembly 50 without the vessel 18 being properly aligned on the base assembly 16 so that the hook portion 57 of the resilient latch member 52 would not engage over the clip 84 and properly latch the vessel 18 to the base assembly 16. Then, when the percolator 15 would be tipped forwardly to pour coffee or the like therefrom, the vessel 18 would fall forwardly out of the base assembly 18.

Figure 11:
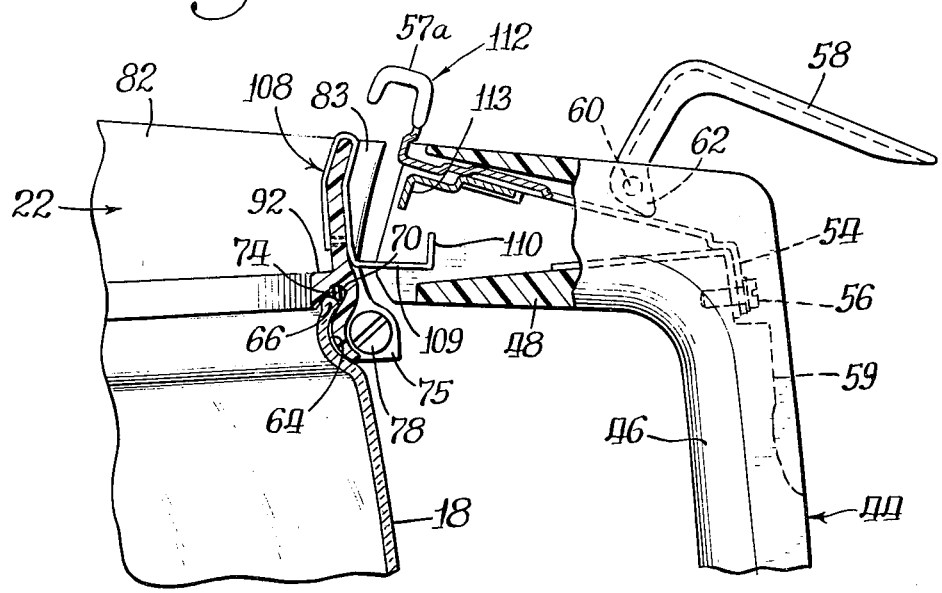
FIG. 11 is a partial side elevational view with some parts shown in vertical section similar to FIG. 5 of a second embodiment of the invention wherein the clip member and the latching member are modified to provide a secondary latching arrangement.
Figure 12:
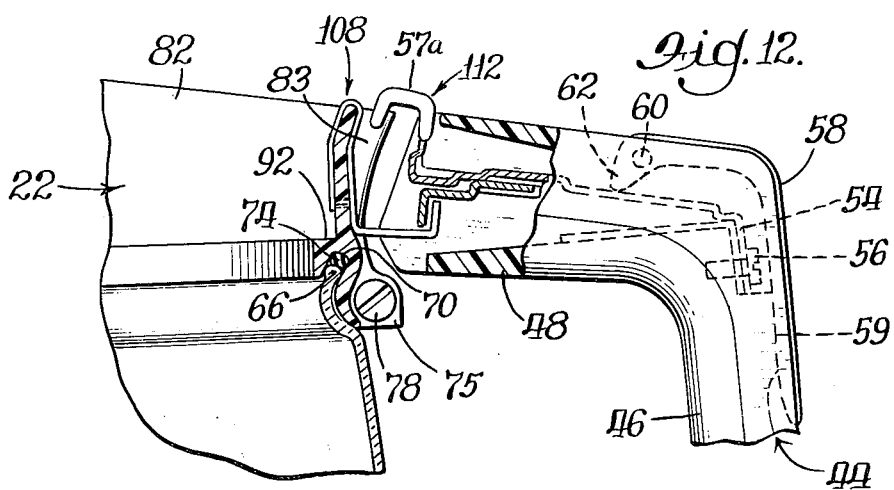
FIG. 12 is a view similar to that of FIG. 11 showing the secondary latching arrangement in latching engagement.
Figure 13:
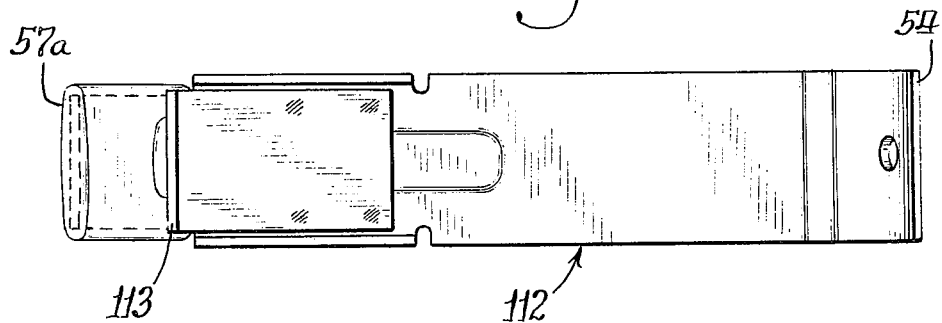
FIG. 13 is an enlarged bottom plan view of the modified latching member of FIGS. 11 and 12.

For this reason, a second embodiment is disclosed in FIGS. 11, 12 and 13 in which the clip member 84 and the resilient latch member 52 of the first described embodiment have been modified to provide a secondary latching arrangement.

As shown in FIG. 11, a modified clip member 108 is provided which has an integral extension portion 109 which extends toward the handle 44 and has an upwardly bent hook portion 110 at its outer end. A modified resilient latch member 112 has a secondary downwardly bent hook member 113 secured to the underside thereof. Therefore, as illustrated in FIG. 12, should the primary hook portion 57a of the latch member 112 not be latched into engagement with the vessel 18 due to a slight misalignment of the vessel on the base assembly 16, the secondary hook member 113 engages the upwardly bent hook portion 110 of the modified clip member 108 and retains the vessel 18 in latched engagement with the base assembly 16 during a pouring operation.

While there has been shown and described two particular embodiments of the present invention, it will be apparent to those skilled in the art that various further changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A coffeemaker comprising a base having a handle extending upwardly therefrom, a vessel supported on said base and being removably retained thereon by a resilient latch member which extends from the upper end of said handle into engagement with said vessel, said vessel having a glass portion including a bottom wall and a side wall which terminates at its upper end with a beaded edge and a non-breakable plastic split collar member which is sealingly mounted on the upper end of said glass portion, said collar member having a pouring spout formation positioned diametrically opposite from split ends of said split collar member, a downwardly opening groove formed in said collar member in which said beaded edge of said glass portion is received, a sponge rubber sealing member seated in the upper end of said groove for sealing engagement with said beaded edge of said glass portion, a metallic clip member fitted over the adjacent split ends of said collar member to extend across any gap present therebetween and having a tab received in alignable horizontal slots formed in said split ends of said collar member, and fastener means for tightening said split ends of said collar member about said glass portion, said resilient latch member having a hook portion adapted to be engaged over said clip member.

2. The coffee maker as recited in claim 1 wherein a secondary latch arrangement is provided to latch said vessel to said base should said hook portion of said resilient latch member not be engaged over said clip member due to an axial misalignment of said vessel on said base, said secondary latch arrangement comprising an outward extension of said clip member having an upwardly bent end portion and a downwardly bent portion of said resilient latch member adapted to be engageable with said upwardly bent end portion of said clip member extension only if said hook portion of said resilient latch member does not engage over said clip member.

3. In an electric percolator of the type characterized by a combination heater-and-handle base assembly, and by primary latch means associated with the handle portion of said base assembly for releasably retaining a vessel on said base assembly, said primary latch means having a resilient hook portion engageable over an upper edge of the vessel, the improvement which comprises, a glass vessel adapted to be mounted on said base assembly and having a non-breakable plastic split collar member sealingly mounted on the upper end thereof, said collar member having a pouring spout formation disposed diametrically opposite split edges of said collar member, a generally U-shaped metallic clip member fitted over the adjacent split edges of said split collar member to extend across any gap present therebetween with said resilient hook portion of said latch means adapted to be engaged over said clip member, said clip member having a bent tab adapted to be engaged through a pair of alignable horizontally disposed slots formed in the split edges of said collar member, fastening means associated with said split edges of said collar member for tightening said collar member on the upper end of said glass vessel, and a twist-lock cover for said collar member.

4. The electric percolator improvement as recited in claim 3 wherein a secondary latch arrangement is provided for retaining said vessel on said base assembly should said resilient hook portion of said latch means not be engaged over said clip member due to a slight misalignment of said vessel on said base assembly, said secondary latch arrangement being characterized by a downwardly bent formation on said primary latch means spaced further from said vessel than said hook formation and engageable with an upwardly bent extension of said clip member only if said vessel should be slightly misaligned on said base assembly.

5. A vessel for serving coffee or the like comprising, a glass member having a bottom wall and a side wall terminating at its upper end with a concave annular groove and a beaded upper edge, a non-breakable plastic split collar member sealingly mounted on the upper end of said glass member, said collar member being characterized by a vertical slot which extends from its upper edge to its lower edge whereby to define a pair of spaced-apart split ends and by a pouring spout formation which is disposed diametrically opposite said split ends of said collar member, a downwardly opening groove formed in the underside of said collar member and defined in part by a depending skirt portion having a convexly curved inner annular surface, an elongated solid sponge rubber sealing member seated in the upper end of said downwardly opening groove, said collar member being mounted on said upper end of said glass member with said beaded upper edge being received in said downwardly opening groove in sealing engagement with said sealing member and with said convexly curved inner surface being received in said concave annular groove formed at the upper end of said glass member, a pair of outwardly projecting embossments formed one on each of the adjacent split ends of said collar member at the lower edges thereof and having alignable horizontally disposed bores formed therein, and nut and bolt fastening means extending through said bored embossments for tightening said collar member on said glass member.

6. The vessel for serving coffee or the like as recited in claim 5 wherein a generally U-shaped metallic clip member having inner and outer leg portions and a bight portion is slipped over the adjacent split edges of said collar member and extends across any gap present between said split edges, and wherein one of said leg portions is provided with a bent tab which extends through a pair of alignable horizontally disposed open-ended slots formed in said edges of said collar member.

* * * * *